United States Patent

[11] 3,600,840

| | | |
|---|---|---|
| [72] | Inventor | Norman K. Meyer<br>4783 N. Bend Road, Cincinnati, Ohio 45211 |
| [21] | Appl. No. | 855,130 |
| [22] | Filed | Sept. 4, 1969 |
| [45] | Patented | Aug. 24, 1971 |

[54] TACKLE BOX
1 Claim, 3 Drawing Figs.

[52] U.S. Cl. .................................................. 43/57.5 R, 206/16 R, 220/20
[51] Int. Cl. .................................................. A01k 97/06
[50] Field of Search .......................................... 43/57.5, 54.5; 312/269; 206/16 R; 220/20

[56] References Cited
UNITED STATES PATENTS
952,314  3/1910  Ellsworth ................... 43/57.5
2,711,050  6/1955  McIntyre ................... 43/57.5
3,377,736  4/1968  Woolworth ................. 43/57.5

*Primary Examiner*—Samuel Koren
*Assistant Examiner*—Daniel J. Leach
*Attorney*—Edward J. Utz

ABSTRACT: A tackle box divided into a pair of separate compartments, wherein fishing lures are hung on removable panels in one compartment and other fishing gear is disposed in trays in the other compartment. The panel compartment is of greater height than the tray compartment to receive panels of various lengths and the cover over the panel compartment is designed to hold the panels in place. The trays in the other compartment are hinged to the sidewalls and to the cover in a manner to expose the trays when the cover is raised.

INVENTOR.
Norman K. Meyer
ATTORNEY

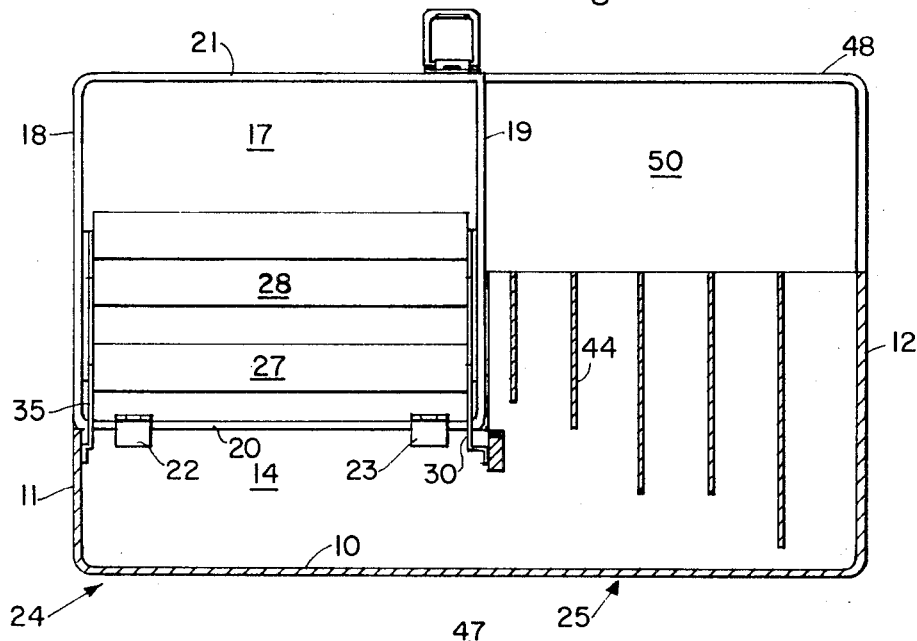
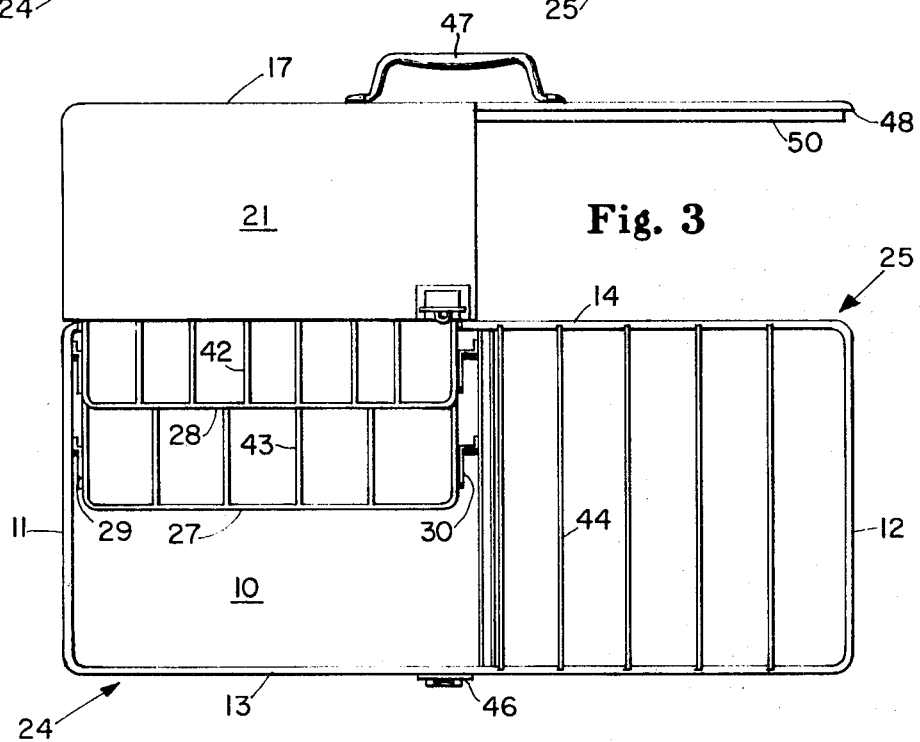

TACKLE BOX

My invention relates to a tackle box of the type used by fishermen and has a particular compartment wherein artificial fishing lures are hung on movable panels separated from a tray compartment arranged for holding other fishing gear. Each panel is specifically removable along with the lures.

The principal object of my invention is to provide a tackle box having removable panels for hanging fishing lures, separated from the tray compartment so that the hooks carried by plugs do not become interengaged with the hooks of other plugs and with fishing lines, flies and other fishing equipment.

Still another object of my invention is to provide a compartmentalized tackle box having removable panels of varying lengths.

Still another object of my invention is to provide a section of a tackle box having a plurality of trays which trays are exposed when the lid carried by the box is raised.

Still another object of my invention is to provide a tackle box wherein the lid is designed to hold the panels in place when the lid is closed.

Still another object of my invention is to provide a tackle box for storing long plugs separately, in addition to various other gear.

A further object of my invention is to provide a tackle box in which the storage spaces for the various lures are formed by a plurality of partition members which divide into spaces wherein the fishing lures may be suspended.

Another object of my invention is to provide a tackle box having trays which are not accessible unless the lid is fully opened.

In general, my invention relates to a fisherman's tackle box wherein the lures are hung on movable panels separated from the tray compartment, which is adapted to hold tackle and other fishing gear. The panels in the box are removable and are so designed that fishing lures may be hung on the panels.

Prior to my invention, tackle boxes did not provide enough compartments of various sizes in which to store the fishing lures and particularly lacked compartments to receive large lures. A further problem of tackle boxes, prior to my invention, was the lack of easy access to the individual tackle gear.

Further, prior to my invention, the tackle boxes when moved or transported, were so made that the fishing lines and gear would become tangled.

In my invention, therefore, I provide separate trays which are fitted within the lid of the tackle box and which are not movable except upon opening of the box. I also provide a compartmental section having removable and slidable panels on which fishing lures of various sizes may be hung.

In the drawings the same reference numerals refer to the same or similar parts throughout the several views and the sectional views are taken looking in the direction of the arrows at the end of the section lines.

FIG. 2 is a detailed sectional view taken along the lines 2—2 of FIG. 1.

FIG. 3 is a top plan view of the tackle box.

Figure 1:
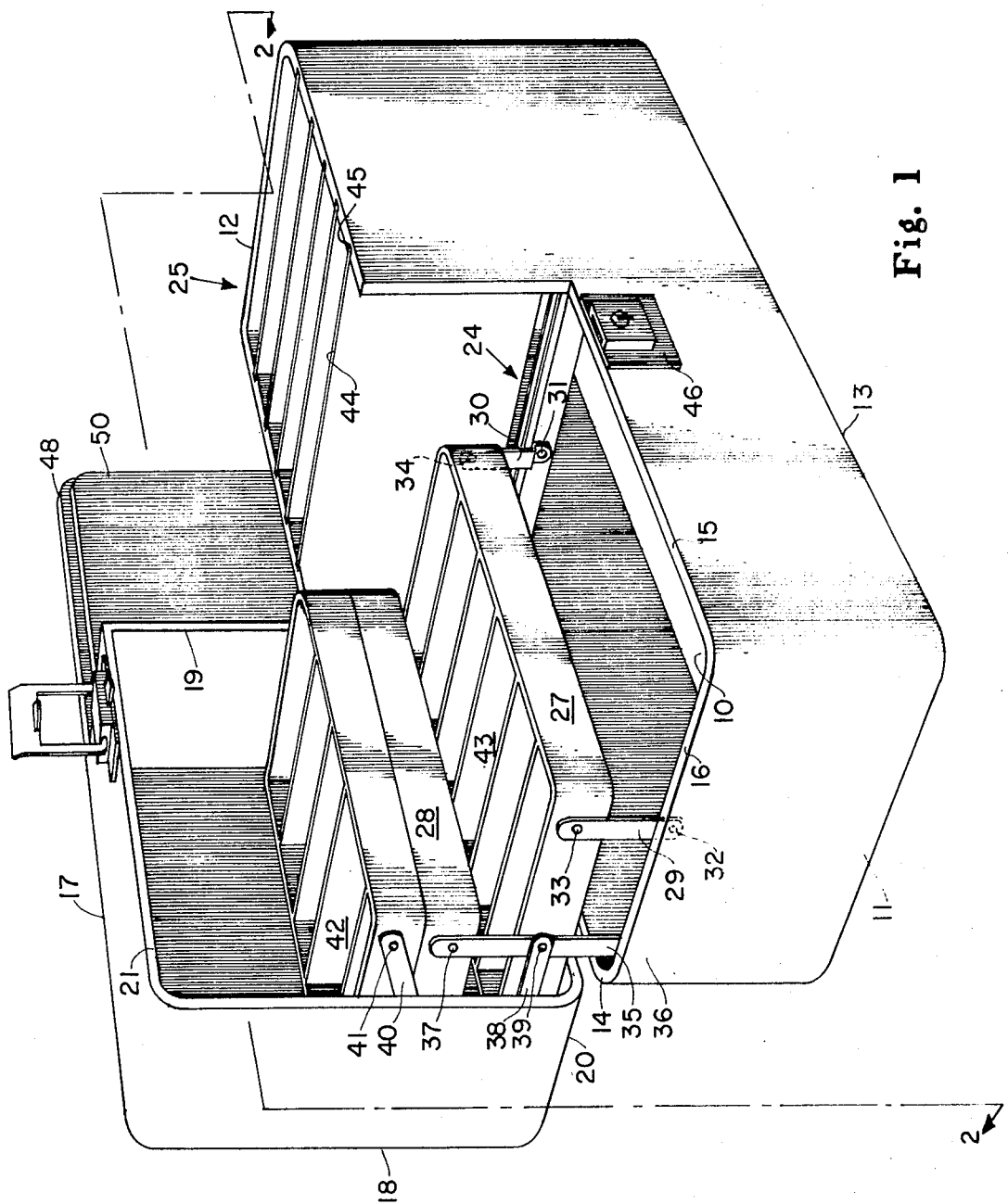
FIG. 1 is a view in perspective of my tackle box in its opened position.

Referring to the numbered parts of the drawings, I show a tackle box having a base portion 10 and sidewalls 11 and 12 affixed to the base 10. Two additional sidewalls 13 and 14 are provided and connect with sidewalls 11 and 12 and base 10. Sidewall 13 and sidewall 14 do not extend to the full height of the box, but have a cutaway portion which is formed from the narrowing of sidewall 13, such as at 15 and the narrowing of sidewall 11, such as at 16 and similarly, the lowering or narrowing of sidewall 14.

I provide a lid 17, which has side members 18 and 19 affixed to it, which side members 18 and 19, along with front and back members 20 and 21 are adapted to mate with the sidewalls 11 and 13 of the lower portion of the tackle box. The lid is hinged by a pair of hinges such as 22 and 23, connecting the sidewall 14 with the sidewall 20.

The box is divided generally into two sections 24 and 25. The side 24 is adapted to receive trays such as 27 and 28. Tray 27 is carried on a pair of hinge members 29 and 30, which pivot around pivot points 31 and 32 at their lower ends, and secured to the tray, the hinge members pivot around 33 and 34.

Rearwardly of the front hinge member, I provide a hinge member such as 35 on each side of the lower tray, which is pivoted within the box at a point such as 36 and which has secured at its upper end the tray 28 pivoted about a point such as 37. Secured to the underside of the cover member 17 is a hinge member 38 pivoted about a point 39 secured to hinge member 35. The hinge member 35 is pivoted around two points 37 and 39, the intermediate pivot point 39 being attached to the lower tray 27 and the upper pivot point 37 being attached to the tray 28. This permits the lid to be opened and the trays to be automatically separated one from the other.

The upper tray is also secured by a hinge member 40 pivoted at 41, the hinge member 40 being secured to the underside of the lid 17. Upon opening the lid 17, the trays automatically position themselves so that they are easily accessible and in the closed position the trays are securely fitted within the opening 24, one on top of the other, so that the lures and other gear secured within the compartments of the trays, such as are divided by separators 42 and 43, will not disperse throughout the box when the box is being transported.

I provide in section 25, a series of slidable members such as 44 of varying depths. These slidable members slide within a groove 45 and are adapted to receive over their upper edges hooks attached to the lures. The lures are hung on the panels by the said lure hooks. The panel members 44 may be slidably removed along with the fishing lures. The fishing lures are of varying length and their entanglement with lures on the adjacent panels is prevented and at the same time space is provided beneath the shorter panels for storing fishing line.

I also provide a latching device 46 and a handle 47 for carrying the box. The upper lid 17 has a cover member 48, which is adapted to cover section 25 when the tackle box is closed.

A resilient pad member 50 is provided under the upper cover 48 and when the lid 17 is in the closed position, the lures are prevented from dispersing themselves within or from the slidable panels.

Having thus described my invention, what I claim as new and useful and desire to secure by U.S. Letters Patent, is:

1. A compartmentalized tackle box comprising a container divided into a pair of separate compartments, and a cover hingedly connected to said container covering both compartments, one of the compartments being of greater height than the adjacent compartment, a series of slidable panels of varying lengths in said first named compartment, said panels adapted to receive hooks attached to lures for storage, said cover over the first compartment comprising a flat portion having a resilient pad secured to the underside thereof to engage the slidable panels, a second compartment having sidewalls, a plurality of trays hingedly connected to said sidewalls and to said cover, said cover over said second compartment having dependent side members to abut said sidewalls on said second compartment, said second compartment carrying fishing tackle separate and apart from lures carried on slidable panels in said first compartment whereby the contents of the tackle box are easily accessible upon moving the hinged cover to an open position.